May 15, 1951  H. A. DARRIN  2,553,134
VEHICLE DOOR CONSTRUCTION
Filed Feb. 28, 1948

INVENTOR
HOWARD A. DARRIN
BY Mason Graham
ATTORNEYS

Patented May 15, 1951

2,553,134

UNITED STATES PATENT OFFICE 2,553,134

VEHICLE DOOR CONSTRUCTION

Howard A. Darrin, Los Angeles, Calif.

Application February 28, 1948, Serial No. 11,977

1 Claim. (Cl. 296—44)

My present invention has to do with automobile door and window construction.

In conventional automobile construction, the door super-structure, which provides slideways and supports for the glass window which moves up and down in the door, is extremely weak, tending to wobble and vibrate and never providing a firm support for the glass.

It is an object of my invention to provide a door super-structure which may be readily and economically installed and which at the same time is substantially rigid and amply reinforced, so that it is capable of withstanding heavy usage without becoming loose and noisy.

Another object of the invention is to provide a door construction which is peculiarly adaptable for use as a door to a vehicle in which a roof opening is provided to afford more head room to passengers entering and leaving the vehicle.

Another object is to provide a novel window construction for automobiles.

Other objects will appear from the following description of the embodiment of the invention which I, at present, find preferable, for which purpose I shall refer to the accompanying drawings, wherein.

Figure 1:
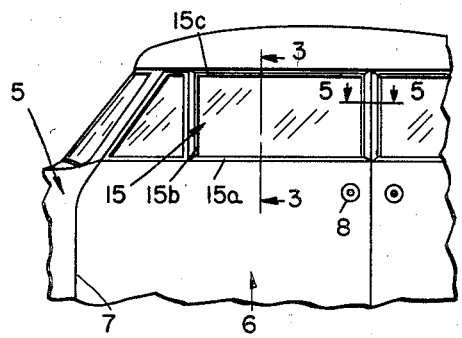
Fig. 1 is a side elevation of a portion of an automobile embodying my invention.

Referring now to the drawings, I show at 5 an automobile body having a door 6 hingedly mounted in the door opening 7 of the body to swing outwardly.

Except for the characteristic features of my invention which will be later described, the door is of conventional construction, and has an opening knob 8.

Figure 3:
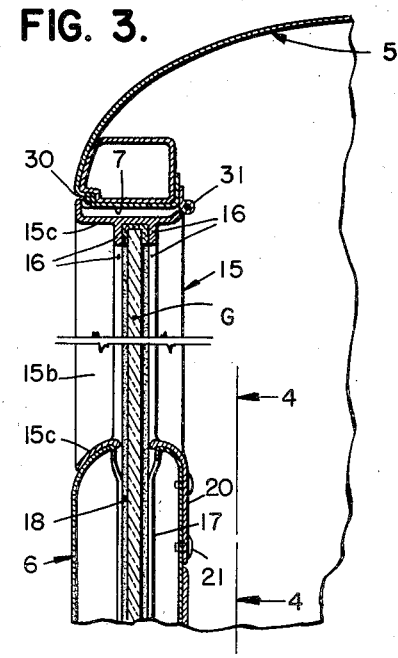
Fig. 3 is an enlarged section taken on line 3—3 of Fig. 1.
Figure 4:
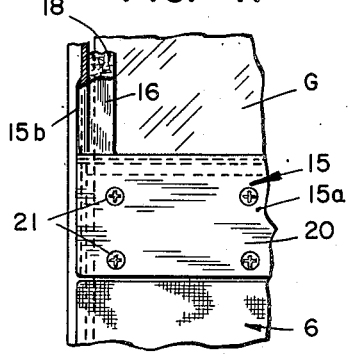
Fig. 4 is a view taken on line 4—4 of Fig. 3.

The door super-structure to which my invention relates is best illustrated in Figs. 3 and 4.

According to the invention, the door has mounted upon its top edge a continuous window frame 15 having a bottom 15a, opposite sides 15b, and a top 15c. Each of the sides, as well as the top, is of somewhat C-cross-section, having projecting medially from its inner surface a pair of spaced parallel ribs 16 which provide slideways for the window glass G which conventionally is slidably mounted in the door channel 17. The channel as well as the slideways are preferably lined with felt or the like 18.

The bottom member 15a of the frame has an inner downward extension or flange 20 by which the entire frame is secured to the inner face of the door as by screws 21.

It will be noted, therefore, that the sides, top and bottom portions of the frame, of C-cross-section, provide for the slideways highly effective flange reinforcement which prevents the frame from being deflected laterally or from wobbling or rattling in use. At the same time this reinforcement positively maintains the slideways in upright position. The entire frame may be installed simply by attaching the flange 20 to the door and may be as readily detached.

As will be best seen in Figs. 3 and 4, the inner flange of the frame is slightly shorter than and does not curve outwardly as much as the outer flange. This is in order to permit the inner flange to pass the weather strip 30 which extends around the door opening but permits it to engage the inner strip 31.

Figure 5:
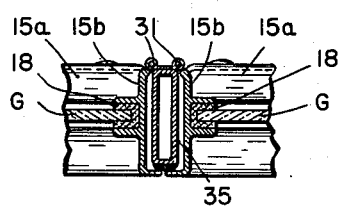
Fig. 5 is an enlarged section taken on line 5—5 of Fig. 1.

In the foregoing, I have described only the frame 15 for the front door of the vehicle, but it will be understood that the same structure may be utilized for the rear door or for the rear side window of a vehicle which does not have a rear door. For instance, see Fig. 5, where the body post 35 dividing the front window from the rear window extends upwardly between side elements 15b of two contiguous frames 15.

Figure 2:
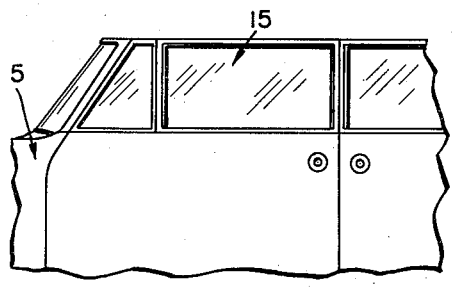
Fig. 2 is a view like Fig. 1, but showing a convertible type body with the top down.

The benefits derived from my structure may be even more apparent in Fig. 2, where a vehicle of the convertible type is shown with the top down and the windows raised. In such cars there is no appreciable lateral support for the window slideways, such as is provided by my invention.

It has been proposed in some low body, low slung automobiles to provide extra head room for passengers entering and leaving the vehicle, by providing a cut-out in the roof or top of the car immediately over the door. My invention is particularly useful for such a construction because it provides a firm and rigid support for the roof portion which fills the cut-out portion when the door is closed. Such a construction is shown in Fig. 6.

Figure 6:
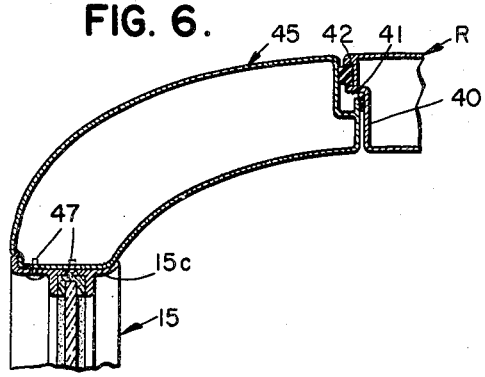
Fig. 6 is an enlarged fragmentary section showing a modification of the invention.

Referring to Fig. 6, the roof R has a cut-out portion defined by the frame element 40. Element 40 presents an undercut 41 and has a weather strip 42 to be engaged by the removable roof portion 45 which fills the cut-out.

This removable roof portion curves downwardly and outwardly to the top of the door super-structure and is attached at its lower edge to the super-structure frame 15 within the channel provided by top element 15c of the frame, as by screws 47. Consequently, as the door opens the removable roof portion moves with the door and is amply supported by my flanged super-structure frame.

I claim:

In a vehicle door adapted to be mounted in a vehicle body opening of greater height than the door, a window frame shaped to outline the remainder of said opening, said frame having a bottom portion presenting a longitudinal downwardly opening channel receiving the top edge of the door in conforming and nested relationship therewith, and having an integral attaching flange depending from and forming an extension of one of its side edges parallel with the underlying surface and secured to said surface of the door, said flange being parallel both longitudinally and transversely with respect to the door surface and in abutting relationship therewith, being coextensive with the length of said bottom portion of the frame and constituting the principal means of attachment of the window frame to the door.

HOWARD A. DARRIN.

REFERENCES CITED

The following references are of record in the file of this patent:

UNITED STATES PATENTS

| Number | Name | Date |
| --- | --- | --- |
| 1,403,664 | Almy | Jan. 17, 1922 |
| 1,413,192 | Ryder | Apr. 18, 1922 |
| 1,619,182 | Best | Mar. 1, 1927 |
| 1,663,517 | Ledwinka | Mar. 20, 1928 |
| 1,855,621 | Bresee | Apr. 26, 1932 |
| 1,861,967 | Ledwinka | June 7, 1932 |
| 1,938,007 | Bottcher | Dec. 5, 1933 |
| 2,210,612 | Widman | Aug. 6, 1940 |
| 2,356,976 | Conlon | Aug. 29, 1944 |

FOREIGN PATENTS

| Number | Country | Date |
| --- | --- | --- |
| 332,839 | Great Britain | July 31, 1930 |